July 28, 1936.                C. JOANNIDES                2,049,011
                APPARATUS FOR THE PRODUCTION OF DENTURES
                    Filed Oct. 23, 1929          4 Sheets-Sheet 1

Inventor.
Christie Joannides

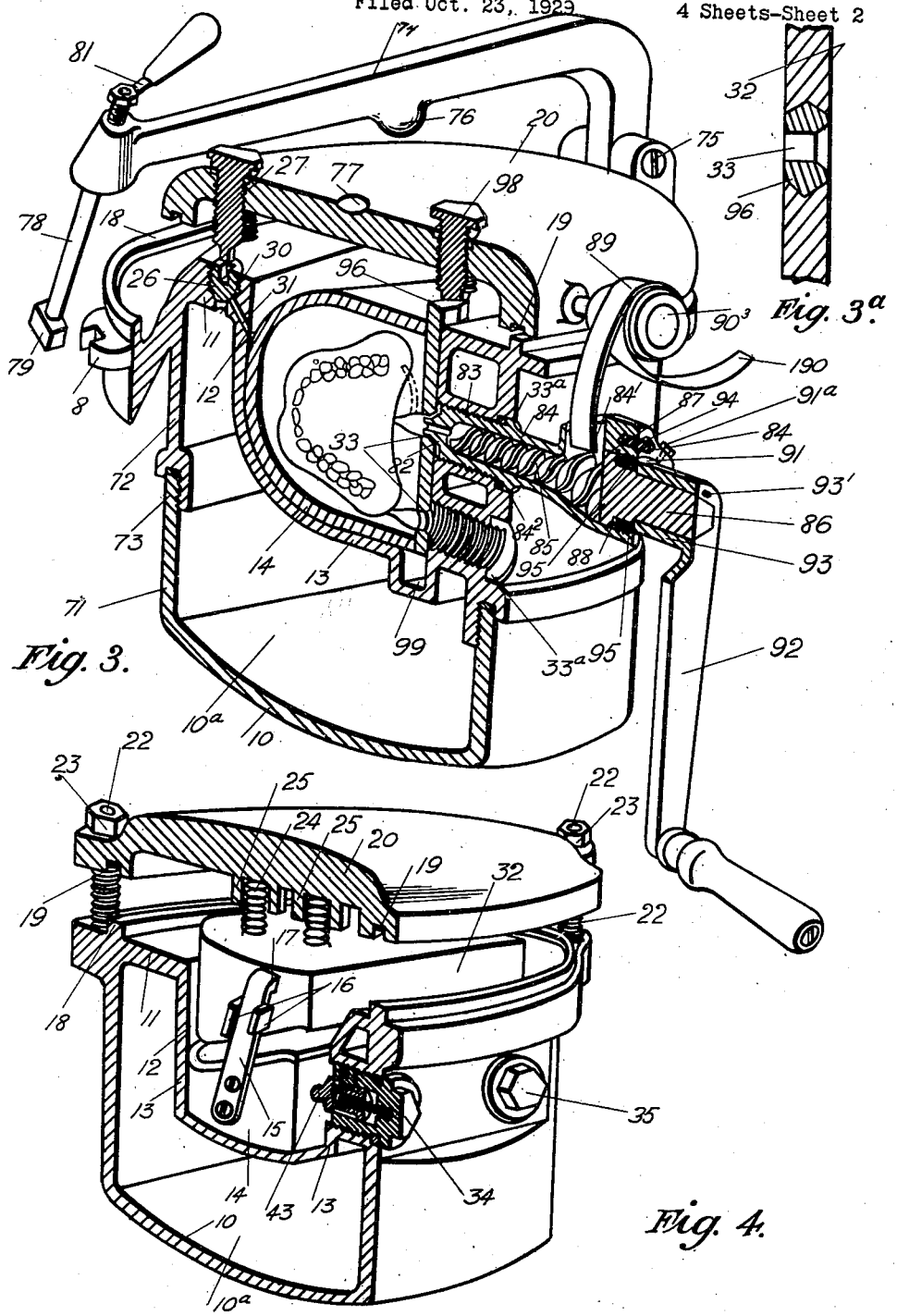

July 28, 1936.  C. JOANNIDES  2,049,011
APPARATUS FOR THE PRODUCTION OF DENTURES
Filed Oct. 23, 1929   4 Sheets-Sheet 3

Inventor.
Christe Joannides

July 28, 1936.　　　　　C. JOANNIDES　　　　　2,049,011
APPARATUS FOR THE PRODUCTION OF DENTURES
Filed Oct. 23, 1929　　　4 Sheets-Sheet 4
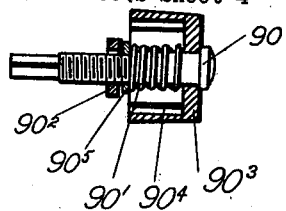
Fig. 7.
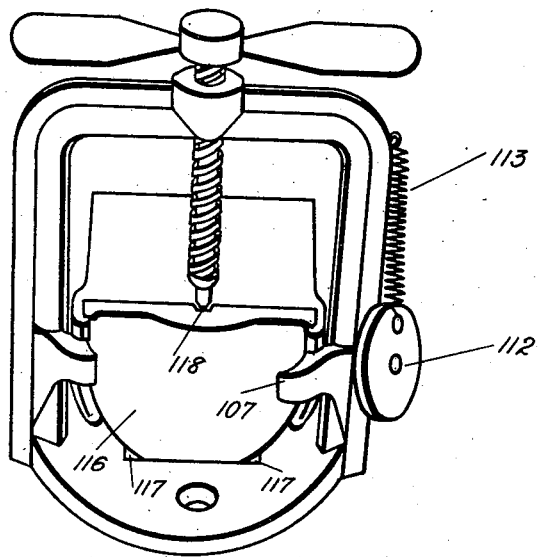
Fig. 10.
Fig. 8.
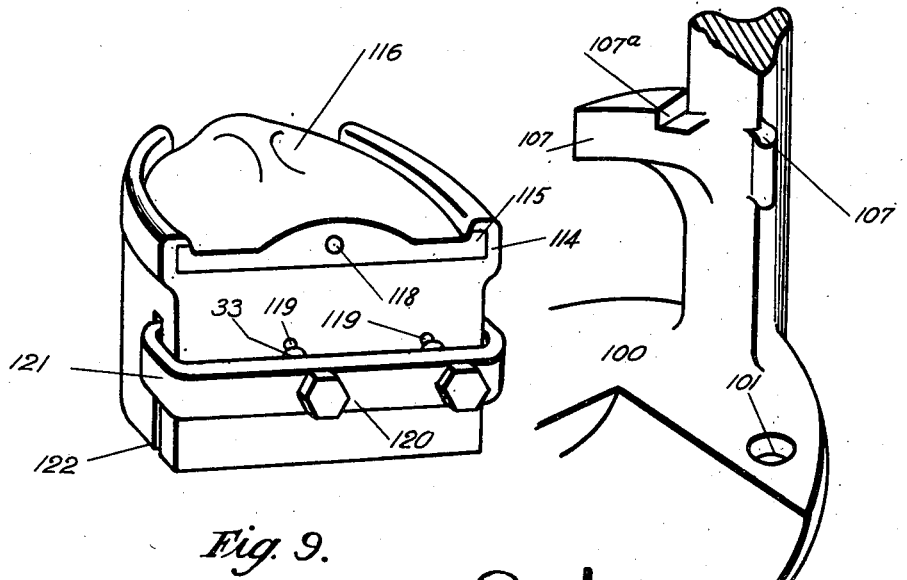
Fig. 9.
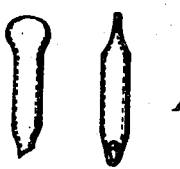
Fig. 11.
Inventor
Christe Joannides Patented July 28, 1936

2,049,011

UNITED STATES PATENT OFFICE 2,049,011

APPARATUS FOR THE PRODUCTION OF DENTURES

Christe Joannides, Constantinople, Turkey

Application October 23, 1929, Serial No. 401,885
In Great Britain November 2, 1928

4 Claims. (Cl. 18—7)

This invention relates more particularly to the production of rubber dentures by feeding a mould through an orifice by a new process and to means for carrying out the process.

It is true that although the process of producing dentures by injecting rubber into a mould offers great advantages over the previous methods, the difficulties still encountered do not render it a practical method for producing dentures.

Amongst the most pronounced difficulties encountered is the compression of plaster and distortion of the mould, due to the toughness of the rubber and the bad heat conductivity of the plaster which renders the process of forcing rubber through the orifice into a mould a difficult proposition. This difficulty is aggravated if rubber of tough nature or rubber which has been toughened by ageing is employed.

Another drawback, difficult to avoid, is that of the pink rubber forming the imitation gum being displaced by the base rubber.

To obviate these drawbacks, it has been proposed to use a seamless mould, to remove the wax by causing the same water in which the flask was immersed and heated in the injecting apparatus to pass through the mould by steam, to heat the flask containing the mould and injecting device simultaneously under steam pressure to facilitate injection, to increase the resistance of the pink rubber to the pressure of the base rubber by partial vulcanization and to reduce the time of the latter operation by incorporating an accelerator with zinc-oxide as an activator.

This process however suffers from the following disadvantages.

(1) Contamination of the mould due to the scouring of the wax with the same water in which the already tarnished flask by previous vulcanizations was immersed and heated and to particles of plaster and other impurities carried into the mould.

(2) The detrimental effect of the steam on the rubber being forced into the mould during injection through the joints of the flask and to particles of plaster being mixed with the rubber and affecting its colour.

(3) The slow heating of the flask for melting and scouring the wax from a seamless mould due to the bad conductivity of the plaster and the time required to increase the temperature to heat the mould.

(4) The change in the plastic properties of the pink rubber by ageing due to the incorporation of an accelerator and activator in a percentage that will, to an appreciable extent accelerate the partial vulcanization.

(5) The change in the properties of the base rubber remaining in the injector cylinder after previous injections due to the overheating, the difficulty of determining the required quantity for every particular case and the necessity of using a larger amount of rubber than is necessary.

(6) Distortion of the mould due to the toughness of the rubber, to the absence of means of heating the flask to a higher temperature than the melting point of the sulphur in the rubber, (owing to the simultaneous heating of the injecting device containing the rubber and the flask), to the great difference in the heat conductivity between the plaster in the mould and injecting device and the absence of means for softening the rubber more than is softened merely by heat.

The difficulties above enumerated may be overcome by the following preferred form:

(1) By isolating the flask from the water used for heating and scouring.

(2) By isolating the mould from water and steam.

(3) By inserting the flask in the apparatus which has been previously heated under pressure and by impinging upon the flask steam.

(4) By applying the accelerator at the time the pink rubber is to be used.

(5) By replacing the injecting cylinder and piston with a device which simultaneously draws and forces the exact quantity of rubber required for injection.

(6) By heating separately the flask and injecting device to the required temperature, and by softening the rubber by heat and mastication, and not merely by heat.

The invention has therefore for its object the provision of a process overcoming the aforesaid difficulties, and an apparatus for carrying same into effect.

The present process broadly consists:—

(a) In the draining and maintaining a mould in a drained condition during heating and injecting.

(b) In heating the flask at the desired temperature without injuriously affecting the properties of the rubber or artificial resin.

(c) In softening the rubber by heating and masticating.

The present invention also comprises an apparatus so constructed and arranged as to permit the aforesaid operations wholly or part thereof, as the case may be, to be effected therein, and equally suitable for processes requiring dry heat or steam pressure, thus overcoming the present drawback of using separate contrivances for different substances and processes.

The invention also comprises the further novel features, as hereinafter described.

A preferred embodiment of the invention is hereinafter described by way of example with reference to the accompanying diagrammatic drawings, in which:—

Figure 3 is a view similar to Figure 1 of a modified form of the apparatus wherein both the boiler and the flask are arranged vertically, showing the means for injecting the rubber into the mould.

Figure 3a is a horizontal section to an enlarged scale of a detail.

Figure 4 is a similar view of a further modification wherein the boiler is arranged vertically and the flask horizontally, showing the plugs in position for closing the apertures in the flask for vulcanization or hardening.

Figure 7 is a perspective rear view of the press shown in Figure 6, arranged for forcing the cover of the flask into position.

Figure 8 is a fragmentary detail perspective view on an enlarged scale of part of the press showing the seating for removing the cover of the flask.

Figure 9 is a perspective view of a preferred construction of a flask for use in connection with the apparatus shown in Figures 1 to 4.

Figure 10 is a sectional elevation of the reel holder shown in Figure 3 for supporting the roll of strip rubber; and Figure 11 is a detail view illustrating the metal tube sprues.

Figures 1, 2:
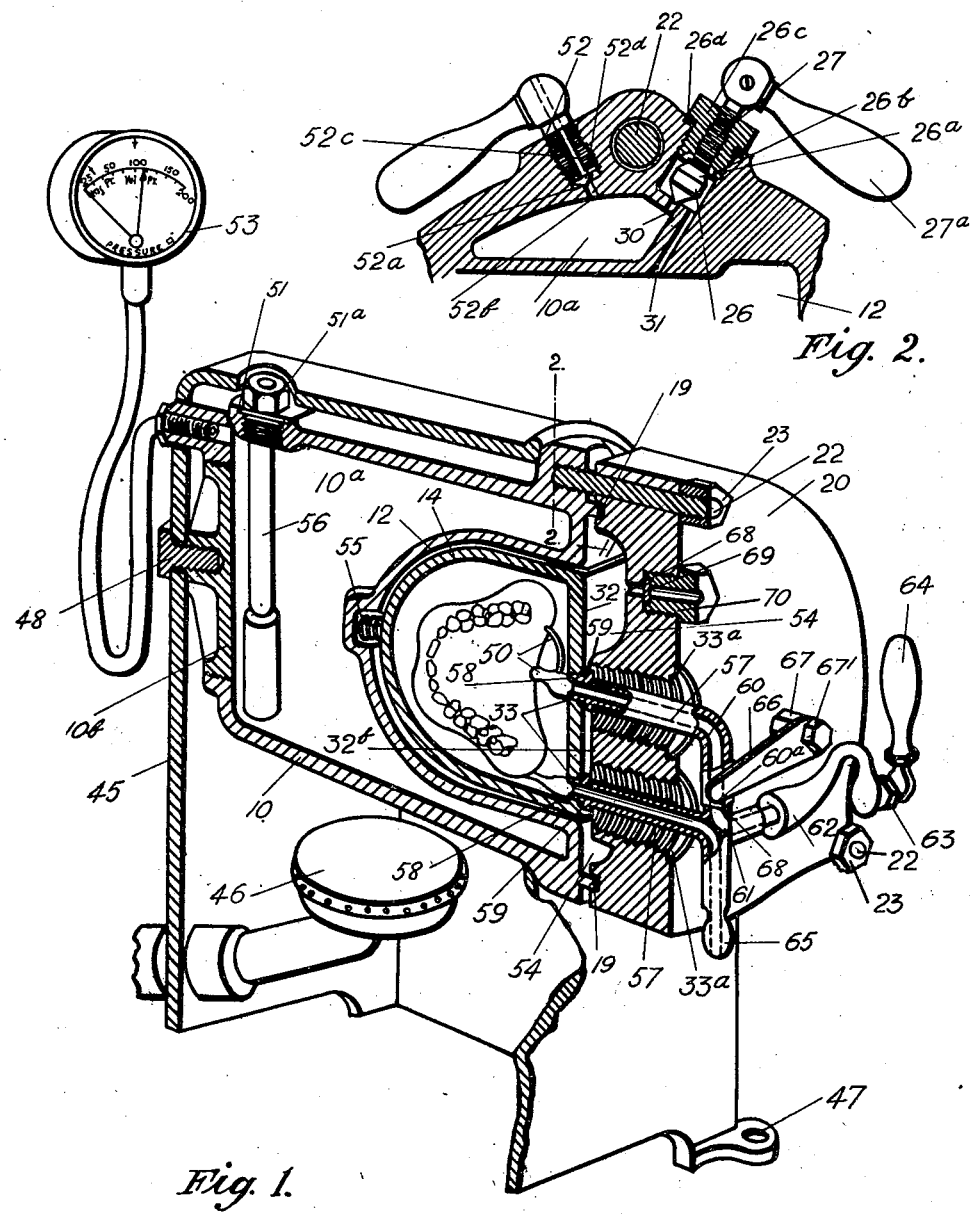
Figure 1 is a sectional perspective view of one form of apparatus according to the invention wherein the boiler is arranged horizontally and the flask vertically, the apparatus being set for the wax scouring-out operation.
Figure 2 is a cross-section on the line 2—2, Figure 1 drawn to an enlarged scale.

Each form of the apparatus shown is so constructed that the three principal operations in the manufacture of a dental plate, namely, the scouring of the wax model out of the mould, the injection of the substance into the mould, and the vulcanization or hardening may be performed in the one apparatus without removing the flask therefrom, and although in Figures 3 and 4 some connections or accessories are omitted for the sake of clearness, the means for carrying out the three operations is substantially the same in each of the three constructions.

In each case the apparatus comprises a boiler 10 having a recess 12 formed in a partition 11 separating the boiler space from the interior of the recess 12, which latter is preferably of a size and shape substantially the same as the flask 14 and is preferably adapted to determine automatically the correct position of the flask therein. Openings 33 in the flat wall 32 of the flask 14 register with openings 33a formed in the wall or cover 20 of the boiler. A valve 26, Figure 2, operable for example, by a screw-threaded spindle 27 from the exterior of the boiler, as by a handle 27a, is provided in the upper part of the boiler wall adjacent the front to enable the interior of the recess 12 to be placed in communication with the boiler space 10a. As shown, the valve 26 comprises a screw-threaded plug having a conical end adapted to fit tightly on a seating 30 communicating with the boiler space 10a and also through a channel 31 with the interior of the recess 12. It will be seen that when the valve 26 is opened, steam from the boiler space 10a may pass into the recess 12 through the channel 31.

When the valve 26 is in the fully open position steam is prevented from escaping along the screw threaded spindle 27 by the engagement of a conical part 26a on the plug with a corresponding seating 26b at the lower end of the bush 26c. Packing 26d is inserted between the flange of the bush 26c and the boiler casting. A valve 52 is provided for releasing the steam when scouring out the wax, such valve comprising a threaded spindle having a conical end 52a which normally closes a passage 52b. The spindle is formed with a longitudinal bore 52c, which at its lower end communicates with a radial hole 52d leading out into the annular space above the seating.

The openings 33 in the flask and the corresponding openings 33a in the boiler wall or cover 20 serve for the attachment of the appliances to be hereinafter described, used respectively in the steps of scouring-out the wax, injecting, and vulcanization or hardening, and are preferably arranged, as shown in Figures 1 and 3 one vertically beneath the other. The openings are preferably of the same size so that the injecting device may be adapted to either of the openings as the case may be.

Referring to Figures 1 and 2, which show the preferred form of the apparatus, the boiler 10 is horizontally arranged within a casing 45 being supported at the rear by a stud 48. A gas burner 46 is provided beneath the boiler. The casing is screwed on a bench during the operation by means of the feet 47.

The recess 12 formed in the partition 11 is adapted to be closed by means of a cover 20 having suitable packing means for ensuring a steam-tight joint at 19 and clamped in place by nuts 23 and studs 22. Substantially incompressible packing consisting of asbestos $\frac{1}{16}$th of an inch in thickness covered with copper or other metal is employed to prevent variation in the distance between the inner face 32b of the cover 20 and the flat side 32 of the flask 14, the cover 20 being formed with an annular recess 54 constituting a steam space to which steam may be admitted when required through the valve 26 and channel 31 (Figure 2).

The inlet 51 for filling the boiler is arranged in the top wall thereof at the rear and projects through an aperture in the casing 45, the inlet preferably being so disposed that when the water reaches the level of the opening the requisite steam space is automatically determined. The opening 51 is closed by means of a plug 51a which may carry an electric heating element 56 as shown, for use in place of the gas burner 46, and a thermostat also may be provided for regulating the temperature. The heating element may be arranged at the bottom of the boiler. A thermometer may also be provided for checking the thermostat.

The boiler and the partition are cast in one piece and the boiler is closed by a plug 10b.

In order to keep the flask 14 pressed towards the inner face 32b of the cover and thus maintain the openings 33 in the correct operative positions the recess 12 is formed with a central depression at the rear housing a spring 55, such mounting also facilitating the removal of the flask. Owing to the small space between the flask and the wall of the recess 12, heat is effectively transmitted to the flask 14. Substantial clearance is preferably provided, as shown, between the rear part of the flask and the wall of the recess, while at the sides only sufficient clearance is provided to allow free movement of the flask. The openings 33 are adapted to receive nozzles 58 at the ends of horizontal tubes 57 formed with flanges near their inner ends adapted to coact with packing rings 59 to ensure a pressure-tight joint with the openings of the flask 14. The lower tube 57 is connected to the lower part of a vertical member 60 having a passage communicating with a bore and leading to an outlet 65. A branch tube 61 on the member 60 has a bore communicating with that of the upper tube 57 and is adapted to receive one end of a short length of hose 62 connected through a valve 63 operated by a lever 64 with the water space 10a of the boiler 10. In order to maintain the attachment, comprising the parts 57, 60, and 61, in position, a spring clamp 66 is secured upon a hexagonal rod 67 rotatably mounted by a bolt 67' in the cover 20 and adapted to be operated by a suitable spanner so that the free end of the clamp 66 may be caused to press tightly against a flat surface 68 upon the member 60. A pin 60a is provided on the flat surface with a corresponding recess on the spring for determining its position. The said attachment comprises the means for scouring-out the wax from the mould.

In order to distribute the rubber uniformly, the flask has an inlet opening at the centre or near to it and an outlet opening away from the centre. The inlet sprue is attached to the wax model in the centre or a little away from the centre, whilst the outlet sprue is attached at a point removed from the centre, on the opposite side thereof preferably to the extreme lower point, as shown in Figure 1. By so arranging the sprues, the cleaning of the mould is satisfactorily effected, the substance is uniformly distributed and it will fill the mould prior to reaching the outlet opening. By this means a third opening in the flask is rendered unnecessary.

The injecting device, as shown in Figure 3 comprises a nozzle 82 formed on the end of a hollow plug 83 which is screwed into the upper opening 33a of the wall or cover 20 of the boiler 10 and fits tightly into the upper hole 33 in the flask 14, being so arranged that the rubber when injected will not come in contact with the walls of the opening. The outer part of the plug 83 comprises a casing 84 adapted to accommodate a helical feeding screw 85 enlarged at its outer end and formed with a flange 87 and a hexagonal extension 86 adapted to receive the boss 93 of a crank handle 92, by which the screw 85 is actuated. A pin 94 is provided upon the end of the casing 84, so that by reversing the crank handle 92 upon the shaft 86, the crank 92 engages with the pin 94 and thereby enables the casing 84 to be quickly screwed into or unscrewed from the boiler. Similarly, the boss 93 of the crank handle 92 may be provided with a small projecting pin 93' adapted, when the handle is reversed, to engage with a shallow recess 95 in the gland ring 91 for the purpose of tightening or unscrewing the latter and a grub screw 91a is provided to maintain it in position. Between the gland ring 91 and the flange 87 of the screw 85 is disposed a series of balls 88 arranged to take up the outward thrust of the said screw. Said balls also act upon the flange 87 under the continuous pressure imposed during injection to cause said flange to fit closely against the wall of the casing to prevent escape of the rubber. The part of the hexagonal extension at which the gland ring 91 is arranged is of cylindrical formation also for the purpose of preventing leakage of the substance.

Dental rubber is supplied to the feeding screw 85, through the aperture 84' in the casing. The openings in the apparatus are similarly threaded, the threads commencing at corresponding points to enable the injecting device to be adapted to either of said openings. The injecting device also is threaded accordingly so that the aperture 84' will always come in the required position.

The hollow plug has at the end of the thread, a collar $84^2$ to allow a washer to be used if necessary to regulate the position of the aperture. To avoid handling thereof the dental rubber 89 is wound in strip form and is preferably arranged on a cylindrical former or tube successive layers of the rubber being preferably separated by a strip 190 of a thin non-adhesive material, such as that known under the registered trade-mark "Cellophane", or other similar material, preferably coloured.

The reel of rubber is slipped upon a holder $90^3$, as shown in Figure 10, rotatably mounted upon a headed rod 90 or tube of metal having a bifurcated end for frictional engagement in a corresponding hole in the cover 20 and carrying a spring 90' controlled, through the intermediary of a washer $90^5$ adapted to engage with a flat or the like upon the rod 90, by a nut $90^2$ screwed on the said rod or tube the said spring 90' being adapted to engage the holder $90^3$ frictionally to prevent too easy unrolling of the rubber strip. The holder $90^3$ is slightly tapered externally and is recessed and slotted as at $90^4$ to ensure effective frictional engagement with the interior of the former or tube the holder being made of bakelite or other heat isolating substance.

As will be seen in Figure 3, the lower opening 33 in the flask 14 is left free during the injection step for ascertaining the filling of the mould.

Figure 5:
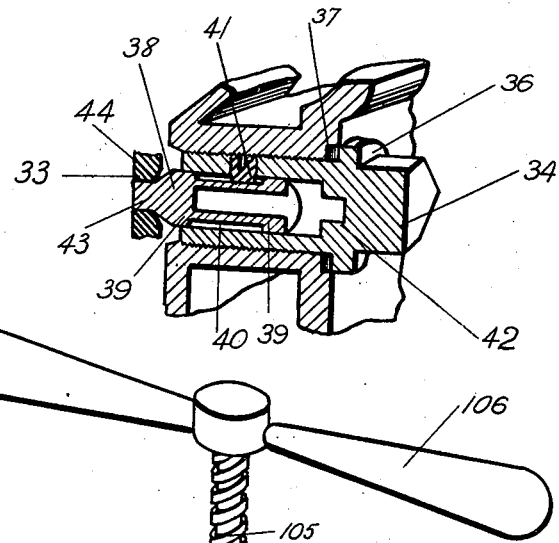
Figure 5 is a fragmentary sectional perspective view on an enlarged scale of one of the closing plugs shown in Figure 4.

For carrying out the vulcanizing operation, the injecting attachment is removed and both of the openings 33 in the flat face of the flask 14 are closed, as shown in Figure 4 by separate plugs 34 and 35 adapted to be screwed into the corresponding holes in the boiler wall or cover. Each plug is provided, as shown in Figure 5, with a flange 36 serving to compress the packing ring 37 against the wall or cover. For the greater part of its length from the inner end, the plug is hollow and contains an auxiliary plug 38 having two flanged ends 39 of a diameter which fits the cylindrical recess in the main plug, and an intermediate part 40 of reduced diameter. A grub screw 41 secured in the main plug extends into the annular recess around the reduced part 40 so as to retain the auxiliary plug within the recess in the main plug. The auxiliary plug 38 is pressed outwardly from the main plug by means of a spring 42 so that the nipple 43 at the outer end of the auxiliary plug is maintained in tight engagement with the corresponding opening 33 in the flask 14. Plugs without auxiliary internal plugs may also be used with the apparatus shown in Figure 1 there being substantial clearance at the bottom of the recess for permitting simultaneous closing of the flask and the cover respectively. When the plugs are screwed home the spring 55 yields, the flask is disconnected from the inner face of the cover whereupon steam envelopes the flask. Preferably the openings 33 are chamfered at the outer edges 44 and the nipples 43 are slightly tapered at a different angle so that the joints are effected adjacent the inner edges of the openings 33. It will be noticed that the member carrying the plug is spaced from the openings in the flask for the purposes of preventing the plastic substance from entering the joints in the plug.

A safety device shown in Figure 1 comprising a fusible plug or washer 69 held in position by a hollow plug 70 screwed into the cover 20 and communicating with the annular steam space 54 through a bore 68 may be provided. When the plug fuses during vulcanization the valve 26 is closed and a fresh fusible plug is inserted and vulcanization continued without releasing the steam of the boiler.

In the particular form of the apparatus shown in Figure 3 the boiler 10 comprises a lower part 71 and an upper part 72 screwed together at 73 or at any other suitable part, suitable packing being provided to ensure an effective joint. The upper part 72 is closed at the top by the partition 11 cast iron piece. The lid or cover 20 may be clamped in position by means of the arm 74 pivoted at 75 and engaging the cover 20 at 77 by means of the projection 76, the arm being tightened down by means of the screw handle 81 co-operating with the bolt 78 headed at 79 to engage with the lug 8 on the boiler.

As shown in Figure 9, the front side of the flask is formed with a thickened edge 114, which is grooved at 115 to receive the sliding cover 116.

The process according to the invention is carried out as follows:—

The wax model is prepared and the teeth are set thereinto in the usual manner, a strip of pink rubber constituting an artificial gum being applied if desired. To facilitate the adaptation and the kneading into the intersticial spaces of the teeth the pink rubber is previously thoroughly heated. In order that the pink rubber may resist the pressure of the injected base rubber the pink rubber is partially vulcanized (after the wax model has been inverted in the flask and the wax scoured out) by using a suitable accelerator preferably in powder form, either alone or mixed with an activator such as zinc oxide, also in powder form, which may be rubbed on to the wax or on the pink rubber itself or both, prior to the application to the teeth. Such partial vulcanization may be facilitated if the pink rubber contains a suitable accelerator in such small percentage that it will not toughen the rubber and cause it to lose its plasticity at ordinary temperatures.

The model thus prepared is secured in the flask at a substantially central position by a little plaster and is connected to the two openings of the flask by wax wires. To eliminate air bubbles on the surface of the pink rubber the latter may be covered with a little plaster before the model is inserted in the flask. The portion of the wax wires adjacent the model are preferably of reduced cross-section. Instead of wax wires metal tubes as shown in Figure 11 may be employed which are flattened at one end for facilitating removal. One of the sprues is arranged at the centre or near the centre of the wax model and is used for the injection, while the other sprue further from the centre of the model preferably at its extremity comprises the outlet, the arrangement of the two sprues ensuring that the water for scouring out the wax shall circulate through the mould before passing out, and be expelled and that the injected rubber fills the mould before it reaches the outlet. The respective wax sprue may be bifurcated if so desired as at 50 (Figure 1 for facilitating scouring).

The flask with the model located in position as above described is filled with plaster in the usual manner and is closed by means of a cover plate and allowed to set. In the meantime the boiler is filled with water, the gas burner 46 or the electric heater 56 is set in operation and the boiler is heated until the pressure gauge indicates about 30 lbs. pressure or more, all valves being closed. By this time the plaster is set, the cover of the boiler is removed, and the flash 14 is inserted into the recess 12 and immediately absorbs heat from the boiler, so that the time for heating the flask is reduced. The valve 26 may be opened, if desired to allow steam to impinge upon the flash in the recess 12 for the purpose of accelerating the melting of the wax, the scouring out attachment having been previously applied and clamped in position.

The melted wax flows out through the outlet tube 65 by gravity, the hose 62 having been temporarily disengaged from the tube 61. The hose 62 is then connected to the tube 61 and the valve 52 is opened to reduce the pressure in the boiler. After the pressure is reduced the valve 63 is opened to allow hot water from the boiler 10 to flow through the hose 62, pipe 61 and upper nozzle 57 into the mould and thence out through the lower nozzle 57 to the outlet 65. The flow of hot water is preferably continued until the water level in the boiler drops below the level of the passage leading to the valve 63, whereupon steam is caused to flow through the mould to drain same by driving out the water that has been used for scouring. A filter of rolled wire gauze is provided in the outlet of the valve 63 to prevent impurities from the boiler entering the mould. After the passage of the steam any water remaining may be blown out after the valve 63 has been closed. The valve 52 is then also closed and the heating of the boiler is continued until a temperature corresponding to a pressure of 20 to 30 lbs. is attained, this temperature being maintained for a period of about five minutes or more as the case may be, so as thoroughly to heat the mould, and, at the same time complete the partial vulcanization of the pink rubber, if any. The pressure and time of heating the mould may vary and depend on the size of the flask. During this heating, the moisture of the saturated mould, is evaporated through the openings which communicate with the atmosphere and by their disposition induce a draught of hot air, if necessary, for further draining the mould, air, preferably hot air, may be forced into the mould in any suitable manner.

The openings of the boiler and the corresponding openings of the flask are so arranged that the free communication of the openings with the mould is easily ascertained, and although hot water or steam may be allowed in the recess, the same cannot be forced into the mould.

From the foregoing it will be seen that the mould is scoured out by the use of hot water which had not been in contact with the exterior of the flask and that the mould is suitably drained prior to the injection. The valve 26, if it has been opened, is closed at the end of the scouring operation and before the operation of heating and draining the mould, and consequently the mould is maintained in the drained condition during such heating and feeding step.

The drained and heated mould is now ready for the injection of the rubber for which purpose the injecting attachment shown in Figure 3, and which has been previously heated to such a degree as to allow the feeding screw or worm to rotate easily by placing it on top of the boiler, is fitted in place by the scouring attachment shown in Figure 1. A reel of strip dental rubber is applied upon the holder 903 and is led into the aperture 84' in the casing 84, the intervening strip 190 of cellophane or equivalent non-adhesive material being stripped off by the left hand, or by attaching a weight to it, as the rubber is fed in. By the action of the screw 85, the rubber is masticated or softened by molecular friction and forced into the mould in a softened condition, avoiding distortion of the mould. As the injecting device is not subject to the direct heat of the boiler, and is not in operative position during heating, it is possible to apply a much higher degree of heat to the mould than would otherwise be the case thereby enabling the rubber to be filled into the mould in a more expanded condition than heretofore tending to avoid any distortion of the plate produced and without the risk of the sulphur in the rubber melting during heating. The complete filling of the mould is indicated when the rubber begins to extrude through the lower opening 33 in the flask 14 and the injection of rubber is then discontinued.

Owing to the rubber being masticated prior to entering the mould a suitable accelerator which will not act at the injecting temperature may also be used and thus the time of vulcanizing a dental plate may be reduced to the minimum. Preferably the accelerator is applied to the rubber, by means of a brush prior to use and in the case of rolled strip the rubber is unrolled, the accelerator is applied and the strip rolled again being then ready for use.

It will be appreciated that as a result of the softening of the rubber by the aforesaid device the injection may be effected at a lower temperature than is the case with the usual injecting device cylinder and piston.

The apparatus and all parts liable to be attacked by sulphur are electroplated with chromium or made of chromium alloy or with other sulphur-resisting metal or alloy such as aluminium, or otherwise constructed to resist the action of the sulphur in the rubber.

The next step in the manufacture is the vulcanization of the denture. This is effected by removing the injecting device, closing the openings 33 by means of the plugs 34, 35 shown in Figure 4, and then opening the valve 26 to allow steam to pass into the recess 12. The valve 26 is opened before the plugs 34, 35 are screwed completely home so as to permit the air in the recess 12 to be expelled whereupon the plugs are tightened down the pressure is increased and the vulcanization is then effected as usual. Before closing the openings by the plugs and opening the valve 26 the excess of rubber in the mould is allowed to escape at the desired temperature for ensuring uniformity of compactness and further to prevent undesirable compression due to expansion of rubber in the mould during vulcanization. On the completion of the vulcanization, the valve 26 is closed and the cover 20 is removed to allow the flask 14 to be withdrawn.

The apparatus may be arranged to receive the flask at any other desired position.

Figure 6:
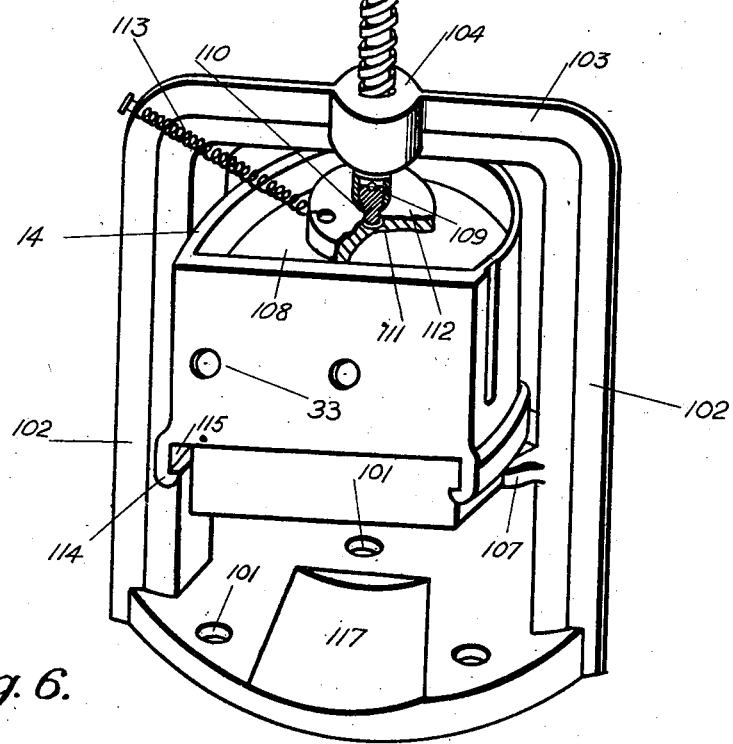
Figure 6 is a perspective front view of a press for use in removing the plaster cast from the flask after the vulcanization or hardening of the denture has been completed.

When the vulcanization has been completed, the plaster cast containing the vulcanized denture is gripped very tightly in the flask and the same may be readily ejected from the flask without damage after the sliding cover 116 has been removed, by the use of a press as shown in Figure 6. To adapt the press for use in operating on the flasks, the uprights 102 are provided at their inner edges with brackets 107, Figure 8, adapted for the reception of the inverted flask 14 as shown in Figure 6. To avoid damage of the cover, the end or point of the screw 105 carries through a ball bearing 109 a revolving nipple 110, the point of which engages a central recess in a pressure plate 112 which rests upon the bottom 108 of the flask and which may be permanently attached to the press by means of a spiral spring 113 or other flexible attachment. This screw press also may be used for applying the cover 116 of the flask. For this purpose as shown in Figure 7, the convex side of the flask is placed downwards in the press, a recess 117 being provided in the base plate 100, Figure 6, for accommodating the lower part of the flask. The point of the pressure screw 105 engages with a small circular recess 118 in the edge of the cover 116 for pressing it into position. For loosening the cover after vulcanization has been completed, the flask is reversed in the press and seats in recesses 107a, Figure 8, a similar hole formed in the convex end of the cover 116 being provided for engagement by the pressure screw 105 aforesaid.

The apparatus according to the invention is applicable and very successful to the production of plates from artificial resin the plate formed by injecting and compressing the substance to the degree required, into a mould which has been drained to a bone dry condition, the substance being hardened by the application of a dry heat to the flask. Blow holes are thus completely eliminated as is the case with the usual two-part mould packed by hand, there being no seam for the substance to escape, and the use of large flasks is eliminated. The drying of the mould and the hardening of the resin may be effected in the same apparatus, if desired, as the injecting device is not in operative position during the drying and injecting steps.

The artificial resin may also be made in short strip form if the aforesaid injecting device is used.

For facilitating the drying of the plaster, the cover may be removed being replaced when the injection operation is commenced or both cover and bottom of the flask may be perforated.

In view of the low melting point of artificial resin and its tendency to run, it is advisable to inject at such low temperature as to prevent too easy running and the injecting device is arranged in the lower opening, both openings being similar. The previous outlet opening becomes the inlet one and the inlet outlet the upper sprue being attached to the upper extremity of the wax as shown in dotted lines in Figure 3, and compression is effected by closing the upper opening and continuing the injection as may be necessary.

Owing to the discolouration of the artificial resin by the plaster the model prior to waxing up is covered with tin foil by pressing and burnishing. The lingual part may also be protected by applying tin foil on the wax model and to prevent displacement thereof the part facing the point of entry of the substance is turned up and secured in the plaster.

When such substance is injected, as for example by means of the injection device shown in Figure 3, the mould may be closed in readiness for the hardening operation, if dry heat is employed by screwing the plug 98 and pressing down the plate 96 (Figure 3), the bottom wall 13 of the recess 12 being formed with a depression 99 into which the lower end of the plate 96 may move. The plate 96 which is made of or plated with a sulphur-resisting metal and forms part of the wall 32 of the flask is shown enlarged in Figure 3a in horizontal section and is arranged to slide in grooves in the said wall of the flask.

If desired steam may be admitted in the recess where the flask is situated then the openings of the apparatus may be closed by the plugs as shown in Figure 4.

In this apparatus the valve 52 is replaced by a valve 26 operated by a plug 27 the valve and the plug being oppositely screw threaded. Hence by turning the plug 27 in the appropriate direction the valve 26 may be opened and closed as does the plug 27.

When, as occasion may arise, it is necessary to effect part of the packing by hand and to complete the filling of the mould by injection the apparatus shown in Figure 4 is of especial utility. The two halves of a suitable mould, partly packed by hand are inserted into the apparatus and pressed together by tightening down the cover 20 by means of the nuts 23, the pressure being transmitted from the cover 20 to the upper half of the flask by springs 24 accommodated in tubular bosses 25, when the parts are pressed into engagement, an automatic catch holds them in position while the injection is carried out, such catch comprising a spring finger 15 on the lower part of the flask 14 extending between the lugs 16 on the upper part and having an inturned end 17 for engaging over the upper part of the flask 32. This catch may be released by means of an appliance adapted to wedge between the wall of the flask and the said catch.

When large numbers of dentures are required, the operation may be facilitated by boiling each flask and scouring the wax separately while the preceding flask is in the apparatus for the purpose of injection, the first flask being removed, as soon as it has been filled for vulcanization elsewhere, in which case the openings 33 in the flask are closed, as shown in Figure 9, by plugs 119 supported in a clamping bar 120, the ends 121 of which are bent around the sides of the flask and engage grooves 122 in the sides thereof. Such grooves open out at the bottom of the flask as shown, and extend for such a distance up the sides of the flask that when the clamping bar is moved to the ends thereof, the plugs 119 are in register with the openings 33 in the flask.

Similarly, scouring water from a separate supply may be used to avoid the necessity of repeated filling of the boiler.

The apparatus according to the invention may be used, if occasion arises, for vulcanization alone.

As the openings of the flask are liable to be damaged by the plugs used when vulcanizing by continuous use such openings may be formed in removable bushes (not shown) of stainless steel, nickel-chromium or other sulphur resisting metal or alloy, or equivalent substance. Moreover, the use of such bushes prevents the rubber from sticking to the metal.

In an alternative method of carrying out the invention a steam tight flask may be employed.

Whilst in the foregoing description the partition is of integral construction the boiler and the partition may be cast separately and screwed together, preferably by a joint made at the middle of the spigot and may be made steamtight by tin soldering or otherwise.

Instead of having the apparatus in two parts screwed together, the partition may be made as a working fit in the boiler and may be formed with a turned over recessed flange with packing which fits upon a spigot of the boiler. The partition may also have a spigot to fit in a recess in the cover provided with packing which closes in both the boiler and the chamber and is bolted in position as above described.

Any other suitable construction of injecting device may be employed. Thus, the device may comprise a pair of co-acting rollers or suitable toothed wheels. Furthermore, to regulate the required compression of the substance into the mould, means may be provided whereby excess substance may be returned to the feed side or inlet of the device, for example, by boring the feed screw, and arranging the bore to communicate with the inlet slot or by leaving a space between the feed screw and the containing cylinder, or by any other suitable means such that the substance may be injected at a constant pressure. It is to be understood that the construction of the boiler and other parts of the apparatus may be modified to answer the requirements of processes coming within the spirit of the invention and the scope of the claims.

The words "seamless mould" in the specification and claims are intended to cover a mould from which the wax is removable without opening same.

The specification and claims refer more particularly to the manufacture of dentures of rubber, or the newly introduced substance known as artificial resin but it will be evident that any substance suitable for dentures and capable of being injected into a mould may be employed.

I claim:—

1. An apparatus for the production of dentures by injection, comprising in combination a boiler and a flask adapted to contain a one-part mould said flask being isolated from the water of the boiler, said flask being provided with more than one opening to effect communication with the exterior, and means for heating the flask to any desired degree without steam or water entering the flask while hot water and steam may be permitted to come in contact with the flask, wherein the openings are alike whereby the injecting device can be alternatively used in either of the openings, the larger portion of the injecting device being exposed to the cooling effect of the air.

2. In an apparatus for the production of dentures from thermoplastic material, a boiler having a re-entrant wall, a flask adapted to contain a one-part mould fitting and detachably held in the recess formed by the re-entrant wall and having in one face a plurality of apertures, means having apertures registering with said first-named apertures and serving for the attachment of injecting and draining devices, a small portion only of the injecting device being exposed to the heat of the boiler water.

3. In an apparatus for the production of dentures from thermoplastic material, a boiler having a re-entrant wall, a flask adapted to contain a one-part mould, said flask fitting and detachably held in the recess formed by the re-entrant wall and having one face with an exposed portion having a plurality of apertures communicating with the exterior of the boiler, the boiler assembly having apertures registering with said first-named apertures and serving for the attachment of the injecting and draining device, the injecting device being exposed but slightly to the heat of the boiler water.

4. An apparatus for the production of dentures by injection, comprising in combination a boiler and a flask having means for isolating said flask from the water of the boiler, said flask being provided with more than one opening so constructed as to be accessible from the exterior, means for heating the flask to any desired degree without steam or water entering the flask while hot water and steam may be permitted to come in contact with the flask, and a detachable injecting device adapted to be mounted in either of said openings.

CHRISTE JOANNIDES.